June 26, 1951  B. B. EWING  2,557,955
LIQUID AMMONIA VAPORIZING AND INJECTING SYSTEM
Filed May 31, 1949
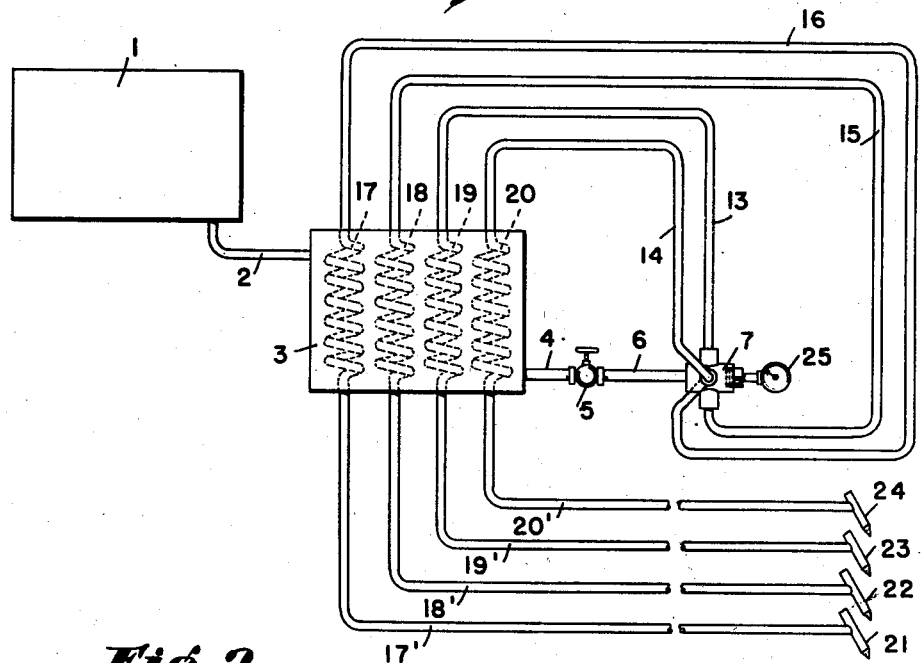
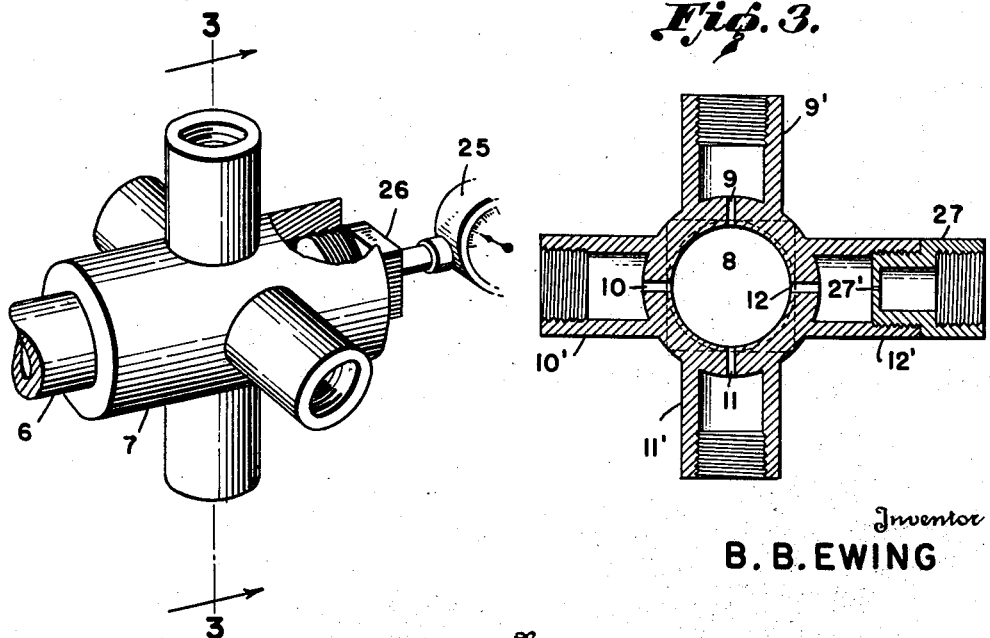
Inventor
B. B. EWING
By
L. M. Mantell
ATTORNEYS Patented June 26, 1951

2,557,955

UNITED STATES PATENT OFFICE 2,557,955

LIQUID AMMONIA VAPORIZING AND INJECTING SYSTEM

Battle B. Ewing, Leland, Miss., dedicated to the free use of the People in the territory of the United States Application May 31, 1949, Serial No. 96,385

1 Claim. (Cl. 62—1)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

I hereby dedicate the invention herein described to the free use of the people in the territory of the United States to take effect on the granting of a patent to me.

This invention relates to a metering device, system, and method for use in converting a liquified gas to vapor. It particularly relates to a metering system for use in injecting anhydrous ammonia as a fertilizer into soil or into irrigation water.

The invention and its objects will become evident from the detailed description below. In one aspect, it comprises a pressure tank for liquid ammonia, means for cooling the liquid ammonia by heat exchange with partially expanded and at least partially vaporized ammonia, a pressure reducing valve through which the cooled ammonia, in liquid phase, is passed, and a metering manifold through which the cooled ammonia also in liquid phase is passed, and means for expanding and cooling the ammonia, and for injecting the ammonia into the soil.

One embodiment of the apparatus and process is illustrated in the accompanying drawing in which:

Figure 1 illustrates the system; Figure 2 describes one form of metering manifold utilizable in the system; Figure 3 is a section on the plane of 3—3 of Figure 2.

The system shown in Figure 1 includes a pressure tank 1 for anhydrous liquid ammonia, or other liquid obtained by compressing vapors. The liquified ammonia in tank 1 is preferably under the pressure of its own vapor, that is, of saturated ammonia gas. A conduit 2, which is preferably a flexible hose or other connector that is not susceptible to breakage by vibration, leads liquid ammonia from the tank to a heat exchanger jacket 3 in which the liquid ammonia from 1 is cooled. Tank 1 may be at atmospheric temperature, and is preferably sealed, except for outlet 2.

The cooled liquid ammonia is passed through conduit 4, and pressure reducing valve 5, to inlet pipe conduit 6 of manifold 7. The cooled liquid ammonia enters manifold 7 at the central chamber 8. From 8, the liquid ammonia passes through a number of metering orifices 9, 10, 11, 12 which may be of identical size, or may be varied. The liquid ammonia is then delivered through respective conduits 9', 10', 11', and 12' to conduits 13, 14, 15, 16. The liquid ammonia passes through and is partially expanded, vaporized, and cooled in conduits 13, 14, 15, 16. The cooled mixture of liquid ammonia and ammonia vapor is then passed through conduits 17, 18, 19, 20 in the heat exchanger jacket 3, and then through conduits 17', 18', 19', and 20' to nozzles 21, 22, 23, and 24. These nozzles may be of any conventional design heretofore used to inject ammonia or other gas into a soil. A number of such devices are known to the art and described in the patents and literature.

The manifold is provided with a pressure gauge 25, which is mounted in clean-out plug or block 26. Pressure gauge 25 communicates with central chamber 8 through a conduit in block 26. If desired, the size of the orifices may be modified by means of removable metering plug 27 having an orifice 27'. In such case the orifice 12 may be enlarged to the full inner diameter of conduit 12'.

The apparatus of Figure 1 may be mobily mounted for application of anhydrous ammonia in the field.

The heat exchanger 3 is designed to provide adequate cooling area to assure that the fluid in manifold chamber 8 remains a liquid under the pressure shown on gauge 25. The ammonia in tubular conductor 4 has been sufficiently cooled by the heat exchanger 3 so that, as it passes through pressure reducing device 5, its vapor pressure will be less than the pressure in tubular conductor 6, and will remain a liquid.

There are no restrictions to the flow of ammonia after passing through the orifices in the metering manifold, other than line resistances. As the pressure on the liquid ammonia in conduits 13, 14, 15, 16 is released, the liquid ammonia begins to vaporize and becomes a mixture of cold saturated liquid and saturated vapor. This mixture then flows through pipes 17', 18', 19', 20' to the soil injector nozzles, in which vaporization may be completed.

The following is suggested as a typical additional example, without inferring restriction thereto, since the apparatus and process are capable of obvious variation by persons skilled in the art.

Assume ammonia flowing at the rate of 1 pound per unit time. The ammonia in tank 1 is at 100° F., being a saturated liquid having an enthalpy of 155.2 B. t. u./pound. This ammonia is metered through orifice 9 at a pressure of 30 p. s. i. gauge. Allowing a margin of safety to assure that the ammonia remains in the liquid state, it is cooled to 10° F.; enthalpy 53.8 B. t. u./pound. The heat removed per pound between tank 1 and orifice 9 is 155.2 B. t. u./pound minus 53.8 B. t. u./pound, which equals 101.4 B. t. u./pound. The major portion of this heat is removed in heat exchanger 3. After metering in orifice 9, the ammonia in hose 13 begins to vaporize and is cooled by vaporization from 10° F. to slightly above −28° F., the temperature at which the vapor pressure of ammonia is equal to atmospheric pressure. The pressure in hose 13 is always slightly higher than atmospheric because of the line resistance to flow. The enthalpy of ammonia at 10° F. (53.8 B. t. u./pound) minus enthalpy of ammonia at −28° F. (12.8 B. t. u./pound) equals 41.0 B. t. u./pound. The heat of vaporization at −28° F. equals 589.3 B. t. u./pound. 41.0 B. t. u./pound divided by 589.3 B. t. u./pounds equals 6.9 percent of the ammonia vaporized in hose 13. An additional vaporization must take place to adsorb the 101.4 B. t. u./pounds which the ammonia in heat exchanger body 3 gives off. Therefore, 101.4 B. t. u./pounds divided by 589.3 B. t. u./pounds equals 17.2 percent ammonia vaporized in flue K. 17.2 percent plus 6.9 percent equals 24.1 percent of the ammonia vaporized when it reaches equilibrium in hose 19'.

It is within the purview of this disclosure to employ conventional pressure gauges and supplementary fine adjustment pressure reducing valves. For example, pressure gauges may be placed in the line before and after the heat exchanger, in conduits 2 and 4, and before and after the pressure reducing valve 5. A second pressure reducing valve may be placed in conduit 6.

Having thus described my invention, I claim:

A distribution system for supplying gaseous ammonia to a soil injector; comprising a pressure tank for liquid ammonia; a heat exchanger having an inlet for liquid ammonia in communication with the tank and having an outlet for liquid ammonia; an ammonia liquid metering and proportioning manifold having an inlet for ammonia liquid and having at least two ammonia liquid outlet metering orifices; a conduit connecting the said outlet of the heat exchanger with the inlet of the metering device; a pressure reducing valve in said conduit; the heat exchanger having means providing at least two passageways for fluid flowing from the outlet orifices of the manifold, the passageways being in heat exchange with ammonia liquid flowing from said tank; conduits connecting each of said passageways with each of the said manifold outlet orifices; and conduits connecting each of the outlets of said passageways with individual soil injectors.

BATTLE B. EWING.

REFERENCES CITED

The following references are of record in the file of this patent:

UNITED STATES PATENTS

| Number | Name | Date |
|---|---|---|
| 2,007,251 | Kniskern | July 9, 1935 |
| 2,018,857 | Kniskern | Oct. 29, 1935 |
| 2,441,204 | Nusbaum | May 11, 1948 |